United States Patent [19]

Kimberly, Sr.

[11] 4,235,939
[45] Nov. 25, 1980

[54] BASE MIXES SIMULATING NATURAL AND DUTCH COCOA POWDERS

[75] Inventor: James R. Kimberly, Sr., Mt. Zion, Ill.

[73] Assignee: A. E. Staley Manufacturing Company, Decatur, Ill.

[21] Appl. No.: 927,076

[22] Filed: Jul. 24, 1978

[51] Int. Cl.³ .......................................... A21D 10/00
[52] U.S. Cl. ................................. 426/549; 426/555; 426/593; 426/631; 426/653; 426/661; 426/584; 426/572
[58] Field of Search ............... 426/578, 661, 555, 593, 426/598, 653, 656, 631, 658, 622, 803, 549, 104

[56] References Cited

U.S. PATENT DOCUMENTS

| 1,349,753 | 8/1920 | Fowler, Jr. ........................... 426/622 |
| 2,389,770 | 11/1945 | Gaver .................................. 426/593 |
| 2,590,647 | 3/1952 | Pettibone ............................. 426/622 |
| 2,623,825 | 12/1952 | Tressler et al. ..................... 426/555 |
| 3,486,905 | 12/1969 | Hotelling ............................ 426/578 |
| 3,615,677 | 10/1971 | Scharschmidt et al. ............. 426/622 |
| 3,639,129 | 2/1972 | Mustakas et al. .................... 426/598 |
| 3,821,420 | 6/1974 | Arden .................................. 426/658 |
| 4,107,345 | 8/1978 | MacDonald et al. ................ 426/661 |
| 4,119,740 | 10/1978 | Crespo ................................. 426/631 |

OTHER PUBLICATIONS

Leach, "Gelatinization of Starch", Starch Chemistry and Technology, vol. I, 1968, pp. 290–306.

Primary Examiner—Raymond N. Jones
Assistant Examiner—George C. Yeung
Attorney, Agent, or Firm—M. Paul Hendrickson; Charles J. Meyerson

[57] ABSTRACT

The functionality of Dutch and natural cocoa powders in cold water and bakery recipes are simulated by a base mix which contains starch granules characterized as having a swelling power of less than 22 and a critical concentration value of at least 5.0 in combination with defatted vegetable seed material. Edible fats, coloring, flavoring and viscosity imparting additives may be included in the base mix to simulate the organoleptic characteristics of the particular cocoa powder which the base mix is intended to extend or replace.

14 Claims, No Drawings

BASE MIXES SIMULATING NATURAL AND DUTCH COCOA POWDERS

BACKGROUND OF THE INVENTION

Within recent years, cocoa prices have significantly increased. The art has sought a replacement or extender for cocoa. Although numerous formulations which simulate chocolate flavors have been proposed, the art has not successfully simulated the physical and functional attributes of cocoa powders in bakery recipes. Natural cocoa products are typically comprised of from about 8–25% fat, about 4.5% to about 20% protein and about 45–60% carbohydrate (sugars, starch, cellulose, pectin, gums, etc.) of which about 4–8% is fiber. The cocoa protein constituents are largely water-insoluble due to interaction and complexing with polyphenolic components. These components are primarily responsible for the unique color, flavor and functional attributes of the cocoa powder. Cocoa powders exhibit unique adsorption and viscosity attributes in cold-water mixes and significantly affect mouthfeel, moistness, texture etc. of the baked product. The unique functional attributes of cocoa powder (natural and Dutch) are best exemplified by their use in chocolate layer cake recipes. Heretofore the art has generally been unable to substitute or replace more than ⅓ of the cocoa powder in layer cakes with synthetic extenders without adversely affecting the quality and character of the baked product. This inability is primarily due to the arts failure to simulate the efficacy and functional attributes of cocoa powders.

The inventor sought a synthetic cocoa base product which would more closely simulate the functional attributes of cocoa powder. By simulating the functionality of cocoal powders, it was anticipated that the extender would function as cocoa powder replacement in a wide variety of food products. The inventor also sought to develop an extender for cocoa powder which would permit effective replacement of cocoa powders with a synthetic extender without adversely affecting the quality and organoleptic character of the recipe.

OBJECTS OF THE INVENTION

It is an object of the present invention to provide a synthetic extender which simulates the functional and organoleptic properties of cocoa powder in food products.

Another object of the invention is to provide a method for preparing food products formulated with a synthetic extender having the functional attributes of cocoa powders and food products formulated therewith.

An additional object of the invention is to provide a method for preparing a synthetic cocoa extender base which possesses the functional and physical attributes of cocoa powders.

DESCRIPTION OF THE INVENTION

According to the present invention, there is provided a synthetic base mix which possesses the functional attributes of cocoa powders in food products, said synthetic base mix comprising:

(A) from about 25 to about 300 parts by weight granular starch characterized as having (at 95° C.) a swelling power of less than 22 and critical concentration value of at least 5.0; and (B) 100 parts by weight of a defatted vegetable seed material with said material containing at least 35% by weight vegetable seed protein, and having an NSI ranging from about 20 to about 80;

with the proportion of said starch component (A) and said seed material (B) being sufficient to provide a base mix which absorbs at least its total granular starch and seed material dry weight in water at 93° C. The aforementioned starch (A) and defatted vegetable seed material (B) components (hereinafter referred to as the "base mix ingredients") may be formulated with other additives such as triglycerides, thickening agents, coloring and flavoring additives, etc.

The granular starches employed in this invention are characterized as exhibiting at 95° C., a critical concentration value of at least 5 and a swelling power of less than 22 (e.g. see page 292, Table I, Starch Chemistry and Technology, Vol. I © 1968 by Whistler et al.). Most granular starches absorb a sufficient amount of water at 95° C. to cause disintegration of the granular structure and release of its water-soluble starch components into the aqueous dispersant. A critical concentration value of at least 5 and a swelling power of less than 22 are indicative of a granular starch which resists both granular disintegration and conversion to water-soluble starches (sometimes referred to as inhibited granular starches). Such inhibited starches may be synthetically produced via modifying granular starches to preserve the granular integrity of the starch in water at elevated temperatures or obtained from unmodified starches which are generally characterized as having a high amylose content or a minute granule size or a combination thereof.

Illustrative high-amylose starches include starches which have an amylose content of at least 35% such as those derived from a leguminous starch source (e.g. wrinkled or chick pea starches, etc.), the high-amylose cereal starches (e.g. hybrid, high-amylose corn starches, etc.), high-amylose starches obtained by fractionating amylose from amylopectin (e.g. high-amylose potato, corn starches, etc.) mixtures thereof and the like. The unmodified high-amylose corn starches containing at least 50% by weight amylose such as MIRA-QUIK "C" manufactured by A. E. Staley Manufacturing Company and "Amylon" 55 and 75 manufactured by National Starch and Chemical Corporation are particularly effective.

The small granule size of unmodified hard wheat and rice starches inhibits these starches from absorbing water and forming water-solubles at elevated temperatures. In contrast, soft wheat granules will absorb more water and form more water-solubles at 95° C. than either the unmodified hard wheat or rice starches. In baking applications (e.g. chocolate layer cakes), the granular hard wheat starches will yield significantly improved results over those obtained with soft wheat starches. Small sized granular starches fulfilling the critical concentration values and swelling power criteria herein may also be obtained from other starch sources by fractionating (e.g. via air classification) the smaller-sized starch granules from the larger sized starch granules.

Inhibited low-amylose starches may also be used as a starch component. Unmodified, low-amylose starches (e.g. less than 30% amylose), such as corn, wheat, potato, waxy maize, tapioca, etc. readily disperse into aqueous mediums when cooked at 72° C. or less under atmospheric conditions. Inhibited starches are typically obtained by treating unmodified granular starches with small amounts of divalent chemical reagents capable of reacting with hydroxyl groups of two different starch molecules within the starch granule. When these cross-linked starches are cooked at temperatures which weaken or destroy the hydrogen bond (generally responsible for holding the granule intact), the integrity of the swollen granule is chemically maintained by the cross-linkages therein. Illustrative polyfunctional reagents conventionally used to prepare such inhibited starches include mixed anhydrides of acetic and adipic acid, phosphorous oxychloride, metaphosphate, epichlorohydrin, acrolein, diepoxides, etc. When cooked in water at temperatures below their gelation point, inhibited starch granules hydrate and swell without bursting (i.e. the granules sacs remain intact).

As more fully explained in the Examples, Brabender viscosity and hot water-solubility tests are helpful in ascertaining the efficacy of the granular starch components herein. Brabender viscosities of less than 50 Bu (preferably less than 30 Bu) at 40 minutes and 95° C. and yielding at least 50% by weight water-insoluble starch at 95° C. for 30 minutes are generally sufficiently inhibited to be used as a granular starch component herein.

The defatted seed material functions as a cold and hot water-absorbent component. Defatted seed materials are conventionally manufactured by extracting or by expelling oils therefrom. In general, such defatted seed materials contain from about 40% to about 70% protein, less than 10% ash with the balance being substantially comprised of water-soluble and water-insoluble carbohydrates. The water-soluble or water-extractable carbohydrates (e.g. polysaccharides, mono-, di-, tri-, tetrasaccharides, glucosides, saponins, etc.) typically comprise from about 5% to about 40% of the total carbohydrate weight. Illustrative defatted vegetable seed materials containing at least 35% by weight protein include defatted cottonseed, soybean, pea, sunflower seed, safflower, mixtures thereof and the like. The defatted seed materials employed herein have a water-absorbency at least equivalent to their dry weight in water (i.e. WA of 1) and most typically range from about 2 to about 6. Defatted leguminous seed materials which hydrate and have a water-absorbency ranging from about 2 to about 4 are particularly effective for use in bakery products. Defatted soy flour, grits and concentrates containing from about 40% to about 75% protein (preferably about 45-55%), less than 0.5% fat (ether extraction), about 5-35% carbohydrate (most typically from about 25-35%) and about 1% to about 20% crude fiber (preferably about 2% to about 5%) are the preferred defatted vegetable seed materials.

The NSI (i.e. nitrogen solubility index) of the vegetable seed material affects the functionality of the extenders in certain bakery applications (e.g. chocolate layer cakes). Since the NSI value represents the percentage of soluble proteins (on a total protein weight basis), it indicates the extent of protein denaturization. A low NSI value reflects a high denatured protein concentration and a high NSI indicates a high percentage of water-soluble or undenatured vegetable protein. The amount of water, processing temperatures, period of treatment, and the presence or absence of denaturing solvents are factors which affect the NSI of processed defatted vegetable seed materials. The manufacturer typically toasts the defatted seed material for a prescribed period of time so as to achieve a predetermined NSI product. An NSI of at least 35 to about 75 and particularly those having an NSI between about 50 to about 70 are best suited for mixes which simulate cocoa powders in bakery formulations.

The particle size of the defatted seed material affects the hydration, wetting, dispersibility, hydrocolloidal, texture and mouthfeel character of the base mix. Excessively large defatted vegetable seed materials (e.g. greater than 420 microns) are difficult to hydrate, uniformly disperse and maintain in homogeneous aqueous suspension. Large particles also impart a gritty texture and mouthfeel to the final recipe. Excessively fine particles (e.g. <25 microns) tend to hydrate non-uniformly, form viscous solutions and contribute inferior textural and organoleptic properties to the finished recipe. For most applications, the particle size will range between about 40 microns to about 150 microns in size. Certain recipes (e.g. chocolate layer cakes, ice cream, icing, etc.) typically require a narrower particle size distribution. In layer cake recipes, cocoa powder functionally is most appropriately simulated with particles having an average particle size ranging from about 55 to about 80 microns.

The relative proportion of granular starch and vegetable seed material in the base mix will depend upon the particular properties of the starch and seed material used to formulate the mix. For most bakery applications, the base mix will most typically contain about 75 to about 150 parts for each 100 parts by weight defatted vegetable seed material.

It is also desirable for the starch and seed material to collectively yield a base mix which closely approximates the water-absorbency character of cocoa powder. To simulate the water-absorbency characteristics of natural and Dutch cocoas, the base mix (i.e. granular starch, vegetable seed material and gums if added) is generally characterized as having a water-absorbency of at least 1.0. For most applications, the weight ratio of the fully hydrated base mix ingredients to unhydrated mix dry weight in 93° C. water should range between about 3:2 to about 4:1 with improved performance being achieved with mixes which have fully hydrated to a dry mix weight ratio of about 2:1 to about 3:1 (i.e. dry mix absorbs from about 2 to about 3 times it dry weight in 93° C. water).

Natural and Dutch cocoa powders may be simulated with the base mixes of this invention. Natural cocoa powders are more viscous than Dutch cocoa powders. The viscosity characteristics of natural cocoa powders may be simulated by increasing the vegetable seed material content employing a higher NSI seed material or by adding gums to the base mix formula.

Conventional gums may be used to impart the desired viscosity effect to the base mix. As understood by the art, gums are colloidal and often are referred to as hydrophilic gums or hydrocolloids. Such gums include edible polymeric materials which thicken or gel when dissolved or dispersed in water. Illustrative gums include natural gums (e.g. gums found in nature), modified gums or semi-synthetic gums (e.g. chemical derivatives of natural materials and gums obtained by microbial fermentation of natural materials), synthetic gums (e.g. synthetically made from chemicals) mixtures thereof and the like. Exemplary gums include natural plant polysaccharides such as tree extrudates and extracts (e.g. arabic, tragacanth, karaya, larch, ghatti, etc.); seed or root gums (e.g. locust bean, guar, psyllium seed, quince seed, etc.); seaweed extracts (e.g. agar, algin, carrageenin, furcellaran); proteinaceous gums (e.g. casein, albuminum, gelatin, soy proteins and wheat gluten hydrolyzates, etc.); pectin, cellulosic gums (e.g. carboxymethylcellulose, methylcellulose, hydroxypropylmethylcellulose, hydroxypropyl cellulose, hydroxyethylcellulose, ethylhydroxyethylcellulose, microcrystalline cellulose, etc.); modified food starches (e.g. pregelled starches such as pregelatinized tapioca, corn, potato, waxy maize, canna, arrowroot, sorghum, waxy rice, and sorghum, wheat, rice starches, etc.); derivatized starch esters and/or ethers (e.g. carboxymethyl, hydroxyethyl, hydroxypropyl, etc.); starch hydrolyzates, dextrins, etc.; microbial gums (dextran, xanthan gums, etc.); derivatized natural gums (e.g. low methoxyl pectin, propylene glycol alginate, carboxymethyl locust bean gum, carboxymethyl guar gum, etc.); synthetic gums (e.g. polyvinylpyrrolidine, polyvinyl alcohol, ethylene oxide polymers) mixtures thereof and the like.

For most applications, the viscosity of the base mix formulation will range from about 5 to about 20 cps for the Dutch cocoa applications and from about 10 to about 30 cps for those mixes simulating natural cocoa powders (@ 10% total base mix dry solids in 23° C. water including viscosity additives). The gum concentration in the base mix will depend upon its efficacy as a thickener. Such gums are generally present in the base mix at a level of less than 25 (e.g. 0–25) and preferably less than 20 parts by weight for each 100 parts by weight defatted seed material.

In simulating the functional attributes of natural cocoa powder, it is advantageous to include a small amount of a modified food starch to achieve the appropriate viscosity level in the reconstituted base mix (e.g. see page 10, lines 18 to 22 above). In contradistinction to the inhibited granular starch component (A) above, these viscosity imparting starches are characterized as readily pasting in hot water, having a critical concentration of less than 5.0 and a swelling power in excess of 22. Modified starches (e.g. thermally or chemically) which form starch pastes in 25° C. water or less at a 1% concentration (d.s.b.) are particularly effective. To stimulate reconstituted natural cocoa powder, the preferred level of viscosity imparting starch additives ranges from about 5 to about 15 for each 100 parts by weight defatted seed material.

In addition to starch, defatted seed material and thickeners, the base mix may also be formulated with solid edible triglycerides solids (i.e. normally solid at 20° C.). The triglyceride imparts a cocoa appearance (e.g. cocoa-like sheen) and improves upon its recipe functionality. Edible fats conventionally obtained from vegetable and animal sources may be used for this purpose. Fats which have a melting point ranging from about 30° C. to about 45° C. with those fats having a melting point from about 35° C. to about 45° C. are preferably employed. Illustrative fats include vegetable fats (e.g. cocoa butter, coconut, palm fats, etc.), animal fats (e.g. butter), hydrogenated vegetable oils (e.g. olive, peanut, rapeseed, corn, cottonseed, safflowerseed, sunflower seed, etc.), hydrogenated marine oils, mixtures thereof and the like. Fats having a melting point less than about 25° C. or greater than 50° C. tend to impart a greasy texture. The fat serves as an effective carrier for natural and artificial flavor and color additives.

The most appropriate triglyceride level in the base mix depends primarily upon what type of cocoa powder the base mix is intended to simulate. Base mixes intended as a replacement for Dutch cocoa will typically contain from about 1 to about 25 parts by weight/100 parts by weight defatted seed material whereas base mixes intended to replace or extend the natural cocoa powder may be formulated with about 1 to about 55 parts by weight fat for each 100 parts seed material. The triglyceride concentration will most typically range from about 5 to about 40 parts by weight for each 100 parts by weight defatted vegetable seed material.

The triglyceride may be blended into the base mix ingredients by conventional dry blending techniques. For certain applications, it is advantageous to coat the base mix ingredients with the triglyceride. Atomization or spraying coupled with temperatures above the melting point of the fat, in combination with dry blending, may be used to coat the base mix ingredients with the triglyceride. Alternatively, the triglyceride may be dissolved in a suitable volatile solvent, blended or mixed with the other mix ingredients and desolventized to remove the solvents therefrom. Impact milling or smearing techniques such as occasionally used in the preparation of dry mixes for cakes and whipped toppings may also be used to coat the base mix ingredients.

By coating the granular starches and defatted seed materials with fat, the mix more closely simulates the sheen, wetting, hydration, dispersion and free-flowing characteristics of cocoa powders. The fat coating also reduces dustiness and functions as a moisture barrier for the granulated starch and vegetable seed materials. When reconstituted in aqueous mediums, the fat coated particles simulate the dispersibility and controlled hydration attributes of cocoa powders.

Base mixes (including the inhibited granular starches and seed materials with or without the viscosity or fat additives) may be used to simulate the unique functional attributes of cocoa powder in recipes with or without the traditional chocolate coloring and/or flavoring. If it is desired to prepare a recipe without the traditional cocoa powder coloring and/or flavoring, a variety of natural and/or synthetic flavors and/or flavor potentiators and/or color additives may be either incorporated into the base mix formulation or recipe to achieve the desired recipe flavoring and/or coloring effect (e.g. see HANDBOOK OF FOOD ADDITIVES, 2nd Edition, CRC (C) 1972, Chapters 11, 12 and 14). Certain culinary products which do not traditionally contain cocoa powders (e.g. yellow, white, lemon, banana flavored layer cake mixes) may be appropriately formulated with the appropriate colors and flavors to provide layer cakes having unique textural and eating qualities which heretofore could only be achieved in cocoa-powder containing recipes. The base mix may be complimented with a wide variety of colorings and flavorings in a variety of recipes to achieve the unique functionality of a fictious uncolored and unflavored cocoa powder.

In a more limited aspect of the invention, the base extender formulation is colored and flavored to simulate the flavor and color attributes of cocoa powders. Natural and/or synthetic flavorings and/or flavor potentiators and/or flavor enhancers and/or coloradditives may be formulated into the base mix in an amount sufficient to impart the desired cocoa flavor and color thereto. Other conventional food additives such as antimicrobial additives, preservatives, antioxidants, sweeteners, surface active agents, humectants, flow-agents, etc. may be incorporated into the base mix as desired.

The base mix may be used in a wide variety of culinary products. They are particularly effective as an extender or replacement for cocoa powders in dairy products, beverages, confections and bakery products. The synthetic cocoa powders of this invention permit beverage, confection and bakery goods processors to directly replace or substitute more than 50% of the recipe cocoa powder with the synthetic cocoa powder without adversely affecting the quality of the finished recipe.

The following Examples are illustrative of the invention:

EXAMPLE I

A base mix simulating Dutch cocoa powder was prepared from the following ingredients:

| INGREDIENTS | PARTS BY WEIGHT |
|---|---|
| Cross-linked dent corn starch[1] | 100 |
| Defatted Soy flour[2] | 100 |
| Partially saturated vegetable oils[3] | 22.5 |
| Cocoa flavoring | 15.9 |
| Cocoa coloring | 6.1 |

[1]F4-261 Staley starch manufactured by A. E. Staley Manufacturing Co., Decatur, Illinois
[2]I-200 soy flour manufactured by A. E. Staley Manufacturing Co., Decatur, Illinois (6% moisture, 53% protein with a NSI of 60, fat 0.9%, 33.9% carbohydrate, 2.5% fiber, 6.5% ash, and water absorption capacity 2.75 times its dry weight at 100° C.)
[3]Durkee D-31 hydrogenated vegetable oils (hydrogenated soybean, palm and cottonseed oils having a 42° C. melting point.

The base mix was prepared by initially dry-blending at 43°–46° C. the inhibited, cross-linked corn starch and the soy flour in a dry blender equipped with a water-jacket. The partially saturated vegetable oil was melted (60° C.), atomized and dry-blended (43°–46° C.) into the heated base mix ingredients. The fat-containing base mix was them ambiently cooled to 23° C. to provide a dry-blend of starch granules and soy flour particles uniformly coated with solidified fat.

The natural and artifical cocoa flavor and artifical cocoa coloring were homogeneously dry-blended into the fat containing base mix at 23° C. The flavored and colored base mix was screened through an 18 mesh screen (U.S. Sieve Series) so as to provide a base mix having an average particle size comparable to Dutch cocoa powder.

A conventional devil's food control cake containing 100% Dutch cocoa powder and one in which 50% of the Dutch cocoa powder was replaced with the base mix were prepared. The cake volume, symmetry, texture, moistness, mouthfeel, flavor, color and overall eating quality characteristics of the base mix containing recipe were comparable to the control cake recipe. Due to the sensitivity of the devils food cake recipe system, replacement of 50% by weight of the Dutch cocoa powder with the synthetic cocoa extender herein would normally be expected to severely and adversely affect the baked cake quality.

EXAMPLE II

A base mix simulating the functionality of natural cocoa powder was prepared from the following ingredients.

| INGREDIENTS | PARTS BY WEIGHT | % |
|---|---|---|
| Cross-linked dent corn starch[1] | 100 | 39.30 |
| Defatted soy flour[2] | 100 | 39.30 |
| Partially saturated vegetable oils[3] | 22.25 | 8.74 |
| Pregelatinized waxy maize starch[4] | 11.76 | 4.62 |
| Natural and artificial cocoa flavoring | 15.35 | 6.03 |
| Artificial cocoa coloring | 5.12 | 2.01 |
| | 254.48 | 100.00 |

[1]Supra
[2]Supra
[3]Supra
[4]A cold-water pasting starch "DURA-GEL RTF" manufactured by A. E. Staley Manufacturing Co., Decatur, Illinois prepared by chemically treating a waxy maize starch with phosphorous oxychloride.

The synthetic natural cocoa extender was prepared in accordance with the recipe of Example I with the molten vegetable oil being homogeneously dry-blended together with the cross-linked starch, pregelled starch and I-200 soy flour. The resultant extender for natural cocoa powder was comprised of starch granules, the pregelled starch and soy flour particles uniformly coated with a solidified fat coating.

A conventional chocolate frosting mix and an extended frosting mix, wherein 50% of the natural cocoa powder was replaced with the natural cocoa powder extender, were prepared. The hydration, peaking, aeration, moistness, grain, texture, flavor, color, mouthfeel, freedom from syneresis, etc. properties of the extended chocolate frostings were comparable to the natural cocoa frosting. Although the base mix may be used to completely replace cocoa powder without adversely affecting the textural qualities of the finished recipe, overall flavor of the finished recipe is improved when it is used to replace about 25% to about 75% of the cocoa powder (preferably between about 40% to about 60%).

EXAMPLE III

This Example comparatively illustrates the water-absorbency of Dutch and natural cocoa powder simulating base mixes containing soy flours, differing NSI values, uninhibited starch, a 60 NSI soy flour, Dutch and natural cocoa powder. The test samples for the Dutch cocoa powder simulating base mix consisted of equivalent weights (i.e. 50/50) of inhibited starch[1] and soy flour[2] of an NSI as designated below. The natural cocoa simulating base mix consisted of 5% pregelled starch[4] and equivalent weights of soy flour and inhibited starch (i.e. 42.75% by weight).
[1]Supra
[2]Supra
[4]Supra In each test, a ten gram sample was gently stirred with a spatula in a 50 ml. conical centrifuge vial containing 25 ml. water at the designated temperatures, allowed to hydrate for 15 minutes without stirring and centrifuged at a relative centrifuge force of 532 (International Clinical Centrifuge, Model CL No. 49491H, Arm 215, manufactured by IEC, Boston, Mass. at 2400 rpm) for 5 minutes. The water-absorbency values (WA) for each test sample was then determined by the following equation:

$$WA = \frac{W' - W''}{S}$$

wherein $W'$ represents the total amount of water in the centrifuge vial, $W''$ the ml (i.e. gms) of supernatant (i.e. unbound water) after centrifugation and "$S$" represents the sample dry weight.

| NO. | SAMPLE (10 grams) | SUPERNATANT (ml) 21° C. | SUPERNATANT (ml) 93° C. | WATER ABSORBENCY 23° C. | WATER ABSORBENCY 93° C. |
|---|---|---|---|---|---|
| 1 | Dutch cocoa powder | 1 | 1 | 2.4 | 2.4 |
| 2 | 35 NSI Dutch | 11 | 1 | 1.4 | 2.4 |
| 3 | 60 NSI Dutch | 8 | 1 | 1.7 | 2.4 |
| 4 | 80 NSI Dutch | 7 | 1 | 1.8 | 2.4 |
| 5 | Natural cocoa powder | 8 | 6 | 1.7 | 1.8 |
| 6 | 35 NSI natural | 7 | 2 | 1.8 | 2.3 |
| 7 | 60 NSI natural | 4 | 4 | 2.1 | 2.1 |
| 8 | 80 NSI natural | 6 | 3 | 1.9 | 2.2 |
| 9 | 60 NSI Soy flour[1] | 0 | 0 | 2.5 | 2.5 |
| 10 | Inhibited starch[2] | 19 | 0 | 0.24 | 2.5 |

[1]Supra
[2]Supra

As illustrated by the above data, the water-absorbency for the Dutch cocoa powder simulating mixes (i.e. Samples 2–4) were the same as the Dutch cocoa powder at 93° C. The higher NSI soy flours (i.e. Samples 3 and 4) more closely approximate the Dutch cocoa powder at an ambient temperature. The pregelled starch increases the cold-water-absorbency of the natural cocoa powder simulating base mixes, but the reduced concentration of inhibited starch and soy flour results in a lower water-absorbency at 93° C. (e.g. compare 93° C. results of Samples 2–4 with Samples 6–8). The water-absorbency for the 60 NSI soy flour above (e.g. see Sample 9 results) remain constant at 23° C. and 93° C. The inhibited strarch by itself (e.g. see Run 10) has a low water-absorbency at 23° C. and higher water-absorbency at 93° C.

EXAMPLE IV

Devil's food cakes were prepared from recipes containing natural cocoa powder (control); and unmodified regular dent corn (PFP), inhibited starch[2], rice, soft winter wheat and hard winter wheat[5] starch base mixes. The baked cake volumes for the hard winter wheat (1700 cc) and rice starch (1630 cc) were significantly greater than the control (1580 cc) with the inhibited starch[2] (1575 cc) results being comparable to the control cake. The hard winter wheat, rice and inhibited starch containing recipes were at least comparable or superior to the control cake. The unmodified regular corn starch containing recipe was significantly inferior to the baked control cake. Although the soft wheat recipe produced an acceptable baked cake volume (1500 cc) the top center of the cake was cupped downwardly. This indicates a failure of the soft wheat starch to maintain structural integrity within the cake during the baking and cooling cycle. Excellent baked cake results may also be obtained in base mixes formulated with high-amylose corn and pea starches.

[2]Supra
[5]Wheat starches procured from U.S.D.A. Regional Laboratory, Peoria, Ill.

For comparative purposes, hot-starch-paste and Brabender tests were conducted upon the hard and soft winter wheat starches, the rice, inhibited corn[2], high-amylose corn and unmodified regular corn starches.
[2]Supra The Brabender viscosities were determined herein on a VISCO/Amylo/GRAPH (manufactured by C. W. Brabender Instruments, Inc., South Hackensack, N.J.) operated at 75 rpm and equipped with a 70 cgm sensitivity cartridge. A 25 gram starch sample (dry substance basis) was buffered at a pH 6.5 with 475 grams of a buffered salt solution consisting of 464.245 grams water, 0.36 grams methyl p-hydroxybenzoate, 0.09 grams propyl p-hydroxybenzoate, 4.5 grams anhydrous benzoate and 1.215 grams granular citric acid. The pH may be adjusted, if necessary to 6.5 with either citric acid or dibasic sodium phosphate. At the commencement of the Brabender test, the temperature of the test sample was 35° C. and the temperature was increased at a constant rate of 1.5° C. for 40 minutes to 95° C.; held at 95° C. for 30 minutes, cooled 30 minutes to 50° C. at a constant rate of 1.5° C./min. and then maintained for an additional 10 minutes at 50° C. The 40 minute Brabender viscosity values reported herein correspond to commencement 30 minutes of the 95° C. cycle; the 70 minute viscosities upon completion of heating the sample at 95° C. for 30 minutes and the start of the cooling cycle; and the 110 minute viscosities refer to completion of the 50° C. - 10 minute hold cycle.

The apparatus for the hot-paste starch test consisted of a two-speed Waring Blendor equipped with a semi-micro monel cup (LaPine 383-9 5-R), a centrifuge operated at a relative centrifugal force (RCF) of 1000 (2000 rpm with IEC 267 head, 250 ml. stoppered bottles) for 15 minutes and a boiling water bath (99.5° C.). The tests were conducted by blending a one gram starch sample (dry substance basis) at a low speed (6100 rpm) into 100 ml. distilled water immediately followed by highspeed blending (13,500 rpm) for two minutes, placing the blended starch sample into a boiling water bath for 15 minutes with gentle and periodic manual shaking sufficient to insure homogeneous dispersal of the starch therein, then adding sufficient hot distilled water (99.5° C.) to compensate for evaporated water (i.e. to 100 ml.) and ambiently cooling the sample to 23° C., centrifuging the 23° C. samples at 1000 RCF for 15 minutes, withdrawing a 25 ml. supernatant aliquot, ambiently drying the aliquot to apparent dryness, and then drying the supernatant residue for 12 hours in an air oven at 110° C. The percent by weight hot-water-starch-solubles was then calculated by multiplying by 100 the product obtained by subtracting the supernatant dry residue from the total starch sample weight divided by the total sample weight.

The Brabender results (i.e. Brabender unit - Bu) for the starch samples respectively at 40 minutes, 70 minutes and 110 minutes were: corn starch 65, 200 and 340; soft winter wheat 0, 0 and 0; hard winter wheat 12, 30 and 60; inhibited starch 0, 0 and 20; high-amylose corn 0, 0 and 0 and rice starch 20, 240 and 290 Bu. The water-insoluble starch residues pursuant to the hot-starch-paste test were: rice starch 54.9%; soft winter wheat 7.4%; hard winter wheat 75.8%; inhibited starch 90.9%, unmodified regular dent corn starch 73.3% and high-amylose corn greater than 99%. As illustrated by this Example, starches which yield less than 50% water-soluble starches fail to produce the baked devils food cake results of those starches which retain at least 50% water-insoluble starch under the hot-paste-starch test.

In addition to exhibiting a low soluble starch content under the hot-starch-paste test, starches providing less than 50 Brabender units (preferably less than 30 Bu) at 40 minutes and less than about 300 Bu at 70 and 110 minutes provide significantly improved results over starches of higher viscosities.

The NSI values reported herein were obtained by placing a one gram test sample into 200 ml. of water, heating and maintaining the test sample homogeneously dispersed throughout the water (gentle magnetic stirring) for 2 hours at 30° C., and pH 6.5, filtering the test sample through Whatman No. 2 filter paper and analyzing the percent by weight protein in the filtrate by Kjeldahl method. The NSI is then calculated by dividing the filtrate water-soluble protein weight by the total test sample protein weight multiplied by 100. The sensitivity (duplicate sample testing for NSI) of the NSI test is typically within a ±3% NSI value.

The vegetable protein materials may also be defined (see Section 102.75 Proposed Rules, Federal Register, July 14, 1978, Part III) as vegetable protein products with flours (e.g. such as soy flour, soy granules, soy grits, etc.) being defined as a product which contain less than 65% protein by weight (moisture free basis), products containing 65% or more and less than 90% protein by weight as protein concentrates, and isolates as containing 90% or more protein.

What is claimed is:

1. A dry synthetic base for use in food compositions which said base mix consists essentially of;
   (A) from about 25 to about 300 parts by weight granular starch characterized as having (at 95° C.) a swelling power of less than 22 and critical concentration value of at least 5.0; and
   (B) 100 parts by weight of a defatted vegetable seed material with said material containing at least 35% by weight vegetable seed protein having an NSI ranging from about 20 to about 80;
with the proportion of said starch component (A) and said seed material (B) being sufficient to provide a base mix which absorbs at least its total granular starch and seed material dry weight in water at 93° C.

2. The base mix according to claim 1 wherein the mix contains from about 75 to about 150 parts by weight granular starch and the defatted vegetable material consists essentially of defatted soybean material characterized as having a water-absorbency ranging from about 2 to about 4 at 100° C. and an NSI between about 50 to about 70.

3. The mix according to claim 1 wherein the mix contains from about 1 to about 55 parts by weight triglyceride having a melting point ranging from between about 30° C. to about 45° C.

4. The mix according to claim 3 wherein the mix contains cocoa flavoring and coloring additives.

5. The mix according to claim 1 wherein the granular starch consists essentially of at least one starch selected from the group consisting of rice starch, hard wheat starch, chemically inhibited starch and high-amylose starch having an amylose content of at least 35% by weight.

6. The mix according to claim 2 wherein the mix contains from about 5 to about 40 parts by weight triglyceride having a melting point ranging from about 35° C. to about 45° C.

7. The mix according to claim 3 wherein the base mix is characterized as having a water-absorbency (at 93° C.) ranging from about 3:2 to about 3:1.

8. The mix according to claim 7 wherein the mix contains from about 5 to about 15 parts by weight modified food starch having a critical concentration value of less than 5.0 and a swelling power greater than 22.

9. In a method for preparing a chocolate flavored food composition by mixing cocoa powder and other food ingredients, the improvement which comprises replacing at least a portion of the cocoa powder with a dry base mix consisting essentially of 100 parts by weight defatted vegetable seed material containing at least 35% by weight vegetable seed protein having an NSI ranging rrom about 20 to about 80 and about 25 to about 300 parts by weight granular starch with said granular starch being characterized at 95° C. as having a swelling power of less than 22 and a critical concentration value of at least 5.0.

10. The method according to claim 9 wherein the dry mix includes cocoa flavoring, cocoa coloring, about 1 to about 55 parts by weight triglyceride having a melting point ranging from about 35° C. to about 45° C., about 75 to about 150 parts by weight of said granular starch and the defatted seed material consists essentially of defatted soybean material having a water absorbency at 100° C. ranging from about 2 to about 5, and an NSI (at 30° C.) between about 50 to about 70.

11. The method according to claim 10 wherein the dry mix includes about 5 to about 15 parts by weight modified food starch having a critical concentration value of less than 5.0 and a swelling power greater than 22.

12. The method according to claim 11 wherein at least 40% by weight of the cocoa powder is replaced with the base mix.

13. The method according to claim 12 wherein the dry mix ingredients are characterized as having a water-absorbency (at 93° C.) ranging from about 3:2 to about 3:1.

14. The method according to claim 13 wherein the food composition is a bakery product.

* * * * *